United States Patent Office 3,273,314
Patented Sept. 20, 1966

3,273,314
REMOVAL OF ALKYNES FROM GASEOUS STREAMS WITH A SILVER CARBOXYLATE ION EXCHANGE RESIN
Harold W. Quinn, Sarnia, Ontario, Canada, assignor to The Dow Chemical Company, Midland, Mich., a corporation of Delaware
No Drawing. Filed June 29, 1964, Ser. No. 378,957
7 Claims. (Cl. 55—63)

This invention relates to the removal of alkynes from a gaseous stream by selective adsorption with a silver carboxylate ion exchange resin. More particularly it relates to a new process for the removal of an alkyne of the formula:

$$RC\equiv CH$$

wherein R is hydrogen, methyl or ethyl from a gaseous mixture containing up to about 5000 p.p.m. of said alkyne by contacting the mixture with a carboxylic acid cation exchange resin in silver salt form.

Acetylene is often an undesirable contaminent of gaseous process streams. For example, the presence of acetylene in the inlet air stream presents one of the most serious hazards in the manufacture of oxygen, nitrogen, and other products by the fractional distillation of liquid air. At normal process temperatures, acetylene freezes to a solid immiscible with other constituents, consequently the solid acetylene accumulates in the process equipment and presents a severe explosive hazard. For large liquid air plants, the acetylene content should be limited to less than 1 part per million (p.p.m.), and preferably to less than 0.1 p.p.m. In the feed stream for ethylene polymerization, the presence of acetylenic hydrocarbons is detrimental not only as an explosive hazard, but also because the acetylenic hydrocarbons poison many of the catalysts normally used thereby causing shorter catalyst life and lower product yields.

Alkynes are produced in small amounts as by products of conventional petroleum refinery operations. Often waste hydrocarbon may be present in the atmosphere in quantities sufficient to give an alkyne content of from 5–10 p.p.m. or more. Removal of alkynes present in these trace quantities is not easily accomplished by distillation. Thus feed streams for liquid air plants are often purified by contact with a catalyst to oxidize the acetylene followed by further treatment to remove the oxidization products. Alternately acetylene has been removed by selective adsorption using solid, high surface area adsorbents such as silica gel, activated alumina, activated carbon, and zeolite molecular sieves.

The present invention resides in the discovery that the silver ion form of ion exchange resins having carboxylic acid groups are extremely effective in the removal of alkynes from air or gaseous hydrocarbon streams at temperatures ranging from 0° to 120° C. and preferably from about 50° to 100° C. By proper choice of operating conditions, parts per million (p.p.m.) of acetylene can be efficiently removed from fast flowing gas streams through contact with the silver carboxylic resin. The adsorbed acetylene is strongly held and is not removed by an inert gas purge at temperatures of up to 120° C. However, the acetylene can be released by treatment of the carboxylate resin with dilute nitric acid.

The carboxylic acid cation exchange resins required herein are preferably prepared by copolymerization of an organic acid or acid anhydride and a crosslinking agent so that a water-insoluble cation exchange resin is obtained. Usually, acrylic or methacrylic acid is used in combination with divinylbenzene, ethylene dimethacrylate or a similar divinyl monomer. Particularly effective is the acrylic acid carboxylic cation exchange resin available commercially as Amberlite 1RC–50 resin. This carboxylic acid resin has suitable physical stability as well as good cation exchange capacity and rate.

To prepare the silver carboxylic resin, the carboxylate resin in sodium form is treated in a conventional manner with an aqueous solution of a water-soluble silver salt such as silver nitrate. After an exchange of substantially all the sodium ions, the resin is washed free of excess silver salt and then dried at 100°–120° C. for 16–20 hours. While essentially complete replacement of the exchangeable cations by silver ions is desirable for maximum capacity, effective silver carboxylate resins are obtained with a silver ion content ranging from 40 to 100% of the theoretical cation exchange capacity.

The resulting silver carboxylate resin can be employed to remove small amounts of acetylene, methylacetylene or ethylacetylene from a gaseous mixture with air, carbon monoxide, carbon dioxide, nitrogen, $C_1$–$C_6$ paraffinic and olefinic hydrocarbons, or inert gases such as helium, neon and argon. While the process is applicable to streams containing as much as 0.5 weight percent (5000 p.p.m.) of these alkynes, it is more advantageously employed with gaseous mixtures containing up to about 300–500 p.p.m. of said alkynes. It is particularly useful in treating large volumes of rapidly flowing gas to reduce the alkyne concentration from 5–25 p.p.m. to less than 1 p.p.m.

The efficiency and capacity of the silver carboxylate resin for the adsorption of acetylene is influenced particularly by the silver ion content of the resin and, by the concentration of the acetylene as well as by such operating factors as the temperature, contact time and flow rate. Extraction studies with the silver ion form of Amberlite 1RC–50 resin established that:

(1) The effective acetylene capacity of the silver resin increases with temperature in the range from about 25°–100° C.;

(2) A column of the silver resin at 64° C. will achieve substantially complete removal of 6 p.p.m. of acetylene from ethylene for at least $9 \times 10^5$ bed volumes at a flow rate of from 150–300 bed volumes per minute; and (3) The silver resin has a much greater capacity for acetylene than other alkynes, although it has a significant capacity for lower alkynes such as methyl- and ethylacetylene.

The markedly greater effective acetylene capacity of the silver carboxylate resin at high temperatures is evidence for a strong interaction involving an activation energy between the acetylene and the silver ions within the resin particles. The capacity of conventional adsorbents which function by physical surface adsorption decreases with increasing temperatures. While the precise nature of the adsorption of acetylene is not fully understood, heavy metal-acetylene complexes area of course well known in aqueous solutions of silver nitrate, mercuric sulfate and other heavy metal salts. With the silver carboxylate resin a mole ratio of adsorbed acetylene to silver ion as high as 1:5 has been obtained. In contrast, however, no significant acetylene capacity has been found with the corresponding mercuric carboxylate resin or the silver form of a sulfonic acid resin.

In practice, a fully exchanged silver carboxylate resin is preferred although carboxylate resins containing at least 40 mole percent silver ion have a significant acetylene capacity. For a fixed bed column operation, a resin in the form of spherical 20–60 U.S. standard mesh beads, is usually convenient. The process can be operated at a temperature in the range from about 0°–120° C., and preferably from about 40°–100° C., using flow rates ranging from about 5–500 or more bed volumes per minute. Optimum operating conditions will depend, of course, on the initial and desired final acetylene concentration. If a final acetylene concentration in excess of 1 p.p.m. is acceptable, higher flow rates or smaller bed volumes can be employed than when the maximum concentration is 1 p.p.m. Normally the process is operated at atmospheric pressure, moderate reduced or superatmospheric pressures ranging from about 0.1 to 50 or more atmospheres may be used provided the feed stream remains gaseous. Fluid bed techniques can also be used.

Normally, the acetylene containing gas stream is passed in contact with the silver carboxylate resin until the acetylene capacity of the resin is nearly or completely exhausted as shown by an increase in the exit acetylene concentration above a desired level. At this point, or earlier if desired, the feed stream can be discontinued or diverted to another unit and the silver resin regenerated. Since the adsorbed acetylene is strongly held, regeneration cannot be achieved with an inert gas purge at a temperature within the operating limits of the resin. However, treatment with dilute nitric acid at 25° to 100° C. readily releases the acetylene. The silver nitrate can be recovered from the nitric acid solution and the resin in hydrogen form converted again to the silver ion form for reuse.

In summary, this invention concerns an improved process for the removal of small quantities of alkynes from gaseous streams through the use of a silver carboxylate resin as an adsorbent. The silver resins are highly permeable, physically strong, and chemically and thermally stable within an operating range of from about 0° to 120° C. Furthermore, the silver resin-acetylene system is insensitive to shock within this operating range. The process can be used at high feed rates and is readily adapted to commercial practice. Selection of optimum operating conditions within the scope of this invention can be readily achieved by a few preliminary tests.

So that those skilled in the art may better understand how the present invention can be carried out and the advantages obtained therefrom, the following examples are given by way of illustration. Unless otherwise stated, all parts and percentages are by weight.

*Example 1.—Removal of acetylene from helium*

A. 100 parts of Amberlite 1RC–50 carboxylic acid ion exchange resin in hydrogen form was placed in an ion exchange column and converted to the sodium form with 1 N sodium hydroxide. After a water wash to remove excess caustic, the resin was converted to the silver ion form by treatment with 1 N silver nitrate. The silver resin was washed thoroughly and then dried for 2 hours at 100° and atmospheric pressure followed by 16 hours in vacuo at 120° C. The dried resin contained 50.6 wt. percent silver.

B. In a typical run to determine the efficiency and capacity of the silver carboxylate resin, about 3.4 ml. (4.0 g.) of the silver resin containing 50.6 wt. percent silver was packed in a 6 mm. diameter tube to give a bed length of about 13 cm. The tube was fitted with appropriate inlet and exit lines and surrounded in a horizontal position by an electric heater. The acetylene concentration in the exit stream was monitored by analysis of frequent samples with a gas chromatographic column having a flame ionization detector capable of detecting acetylene concentrations of less than 0.2 p.p.m. The volume of the exit gas was measured with a wet-test meter until acetylene was first detected in the exit stream. After breakthrough, the resin was treated with dilute (0.1 to 1.0 N) nitric acid at 50° to 100° C. to release the acetylene. The resulting carboxylic acid resin in hydrogen form was readily reconverted to the silver form as described in 1A.

As shown in Table 1, the silver carboxylate resin gave essentially complete removal of acetylene from a stream of helium containing 0.23 percent by volume (2300 p.p.m.) acetylene with a flow rate of about 35 ml./min., i.e., about 10 bed volumes/min., for more than 250 bed volumes of gas at 25° C. and for more than 4300 bed volumes at 100° C.

TABLE 1.—ACETYLENE REMOVAL FROM HELIUM (2,3 P.P.M. $C_2H_2$)

| Run | T° C. | Breakthrough Vol., ml. | $C_2H_2$ absorbed, ml. | Mole ratio $C_2H_2:Ag^+$ |
|---|---|---|---|---|
| 1–1 | 25 | 830 | 1.89 | 1:243 |
| 1–2 | 64 | 3,640 | 8.37 | 1.52 |
| 1–3 | 100 | 14,700 | 33.8 | 1:13.5 |

*Example 2.—Removal of acetylene from ethylene*

The extremely efficient removal of trace quantities of acetylene from an olefinic stream is shown in a run using 1.2 g. (1.0 ml.) of the silver resin described in Example 1A in a column having a bed depth of 3.8 cm. and a feed stream of ethylene containing 6 p.p.m. of acetylene. An indication of the influence of feed rate and adsorption temperature was also obtained by initially employing a high flow rate at room temperature. Then when 0.2 p.p.m. of acetylene was found in the exit gas, the flow rate was reduced or the column temperature increased and the feed resumed until acetylene was again detected in the exit stream. As shown in detail in Table 2, 1.2 g. of silver resin effected substantially complete removal of acetylene from a total of at least 900 l. of ethylene ($9 \times 10^5$ bed volumes), equivalent to 1 mole of adsorbed acetylene per 25 moles of $Ag^+$. Since acetylene was still being adsorbed when the run was terminated, the total capacity of the silver resin is in excess of this value.

TABLE 2.—ACETYLENE REMOVAL FROM ETHYLENE (6 P.P.M. $C_2H_2$)

| Run | Conditions | Breakthrough Vol., l. | Total Volume, l. | Total absorbed $C_2H_2$, ml. |
|---|---|---|---|---|
| 2A | 25° C.; 200 ml./min | 514 | 514 | 3.08 |
| 2B | 25° C.; 100 ml./min | 10 | 524 | 3.14 |
| 2C | 64° C.; 300 ml./min | 210 | 734 | 4.40 |
| 2D | 64° C.; 200 ml./min | 95 | 829 | 4.97 |
| 2E | 64° C.; 150 ml./min | 71 | 900 | 5.40 |

*Example 3.—Removal of other alkynes*

An evaluation of the removal of other alkynes from a flowing gas stream by adsorption with a silver carboxylate resin was made by injecting successive 1.0 ml. samples of the alkyne into a helium stream flowing at 40 ml./min. through a 4.0 g. sample of the silver carboxylate resin described in Example 1A in a 13 cm. deep bed and analyzing the exit stream. The injection of the alkyne was continued until it was detectible in the exit stream. Typical results using acetylene, methylacetylene and dimethylacetylene are given in Table 3.

TABLE 3.—ADSORPTION OF ALKYNES

| Alkyne | Volume added before breakthrough |
|---|---|
| Acetylene | 12.5 ml./64° C.; 85 ml./100° C. |
| Methylacetylene | 1.5 ml./64° C.; 5.5 ml./100° C. |
| Dimethylacetylene | <1 ml./64° C.; <1 ml./100° C. |

While the silver carboxylate resin has a larger uptake for acetylene, it also has an effective capacity for other lower monoalkylacetylenes such as methylacetylene and ethylacetylene. There is, however, essentially no adsorption of dialkylacetylenes. Note also that this technique reveals a resin capacity for acetylene as high as 1 mole of acetylene/5.5 moles of $Ag^+$.

*Example 4.—Other silver ion exchange resins*

In a manner similar to that described in Example 3, the silver salt of a strong acid cation exchange resin (Dowex 50 W, a nuclear sulfonic acid resin) containing 42 wt. percent silver was tested for adsorption of acetylene. No indication of acetylene removal was found.

I claim:
1. A process for removing an alkyne of the formula:

$$RC\equiv CH$$

wherein R is one from the group consisting of H, methyl and ethyl, from a gaseous mixture containing up to 5000 p.p.m. of the alkyne which comprises:
  (A) Contacting the gaseous mixture at a temperature in the range from about 0° to 120° C. with a silver carboxylate ion exchange resin in which at least 40 mole percent of the exchangeable cations are silver ions, whereby the alkyne is adsorbed by the silver carboxylate resin, and
  (B) Recovering therefrom a gas with a lower alkyne content.

2. The process of claim 1 wherein the exchangeable cations of the carboxylic resin are substantially completely replaced by silver ions.

3. The process of claim 2 wherein the adsorption temperature is in the range from about 50° to 100° C.

4. The process of claim 2 wherein the gaseous mixture contains up to 500 p.p.m. of said alkyne in air.

5. The process of claim 2 wherein the gaseous mixture contains up to 25 p.p.m. of said alkyne in air and the recovered air contains less than 1 p.p.m. of said alkyne.

6. The process of claim 2 wherein the gaseous mixture comprises up to 500 p.p.m. of said alkyne in ethylene.

7. The process of claim 2 wherein the gaseous mixture consists essentially of up to 25 p.p.m. of acetylene in ethylene and the recovered ethylene contains less than 1 p.p.m. acetylene.

References Cited by the Examiner
UNITED STATES PATENTS

| | | | |
|---|---|---|---|
| 3,078,636 | 2/1963 | Milton | 55—63 |
| 3,219,717 | 11/1965 | Niles | 260—666 |

References Cited by the Applicant
UNITED STATES PATENTS

| | | |
|---|---|---|
| 2,865,970 | 12/1958 | Thomas. |

REUBEN FRIEDMAN, *Primary Examiner.*

D. M. RIESS, *Assistant Examiner.*